United States Patent [19]

Paul et al.

[11] Patent Number: 5,282,995
[45] Date of Patent: Feb. 1, 1994

[54] COMPOSITION FOR REMOVING AN ALKALINE EARTH METAL SULFATE SCALE

[75] Inventors: James M. Paul, DeSoto; Richard L. Morris, Duncanville, both of Tex.

[73] Assignee: Mobil Oil Corporation, Fairfax, Va.

[21] Appl. No.: 766,306

[22] Filed: Sep. 27, 1991

Related U.S. Application Data

[62] Division of Ser. No. 332,147, Apr. 3, 1989, Pat. No. 5,093,020.

[51] Int. Cl.$^5$ .............................................. C02F 5/10
[52] U.S. Cl. ...................... 252/80; 252/175; 252/180; 252/8.551
[58] Field of Search ............... 252/180, 181, 175, 106, 252/156, 80, 82, 86, 8.551, 8.552, 8.553

[56] References Cited

U.S. PATENT DOCUMENTS

| | | | |
|---|---|---|---|
| Re. 30,796 | 11/1981 | Lesinski | 252/180 |
| 3,625,761 | 12/1971 | Tate | 252/86 |
| 3,684,720 | 8/1972 | Richardson | 252/86 |
| 3,951,827 | 4/1976 | Burroughs et al. | 252/8.552 |
| 3,956,164 | 5/1976 | Walker et al. | 252/180 |
| 4,030,548 | 6/1977 | Richardson et al. | 166/279 |
| 4,190,462 | 2/1980 | De Jong et al. | 134/2 |
| 4,215,000 | 7/1980 | De Jong et al. | 252/8.55 |
| 4,623,399 | 11/1986 | Frenier | 252/82 |
| 4,703,803 | 11/1987 | Blumer | 252/8.553 |
| 4,708,805 | 11/1987 | D'Muhala | 210/698 |

FOREIGN PATENT DOCUMENTS 57-107297 7/1982 Japan.
63-17819 1/1987 Japan.

OTHER PUBLICATIONS

Hawleys Condensed Chemical Dictionary, 11th ed., Van Nostrand Reinhold, NY 1987, pp. 391, 486.

*Primary Examiner*—Prince Willis, Jr.
*Assistant Examiner*—J. Silbermann
*Attorney, Agent, or Firm*—Alexander J. McKillop; George W. Hager, Jr.; Charles A. Malone

[57] ABSTRACT

A method and composition for removing barium and strontium sulfate scale deposits. The composition comprises an aqueous solution having a pH of about 8 to about 14, an EDTA or DTPA chelant, and a catalyst or synergist. Preferred chelants comprise diethylenetriaminepentaacetic acid (DTPA) or ethylenediaminetetraacetic acid (EDTA or alkali salts thereof. Anions of organic and inorganic acids comprise the catalyst. Catalysts which can be used include fluoride, oxalate, persulfate, dithionate, hypochlorite and formate anions. When the solution containing the composition is contacted with a surface containing a scale deposit, the deposit dissolves substantially more scale quicker than heretofore possible.

12 Claims, 8 Drawing Sheets

COMPOSITION FOR REMOVING AN ALKALINE EARTH METAL SULFATE SCALE

This is a division of copending application Ser. No. 07/332,147 filed on Apr. 3, 1989, now U.S. Pat. No. 5,093,020.

FIELD OF THE INVENTION

This invention relates to compositions which are effective in scale solubilizing, particularly strontium and barium sulfate scale, and to a method for removing barium sulfate and strontium sulfate scales, deposits and crystals from surfaces with said compositions.

BACKGROUND OF THE INVENTION

Most water contains alkaline earth metal cations, such as bariums strontium, calcium and magnesium,, and anions, such as sulfate, bicarbonate, carbonate, oxalate, phosphate, silicate and fluoride. When combinations of these anions and cations are present in concentrations which exceed the solubility of their reaction products, precipitates form, until their product solubility concentrations are no longer exceeded. For example, when the barium ion and sulfate ion exceed the solubility of the barium sulfate reaction product, a solid phase of barium sulfate will form as a precipitate.

Solubility product concentrations are exceeded for various reasons, such as evaporation of the water phase, change in pH, pressure or temperature and the introduction of additional ions which can form insoluble compounds with the ions already present in the solution.

As these reaction products precipitate on the surfaces of the water-carrying or water-containing system, they form adherent deposits or scale. The scale prevents effective heat transfer, interferes with fluid flow, facilitates corrosive processes, and harbors bacteria. Scale is an expensive problem in many industrial water systems, in production systems for oil and gas, in pulp and paper mill systems, and in other systems, causing delays and shutdowns for cleaning and removal.

Once through and recirculating, cooling water systems are subject to the formation of scale deposits. Waterside problems encountered in boilers and steam systems include the formation of scale and other deposits, corrosion and foam. Scale and other deposits on heat-transfer surfaces can cause loss of the thermal efficiency of the boiler and can make the temperature of the boiler metal increase. Under scaling conditions, temperatures may go high enough to lead to failure of the metal due to overheating.

Barium and strontium sulfate scale deposits present a unique and sometimes "unsolvable" problem. Under most conditions, these sulfates are considerably less soluble in all solvents than any of the other commonly encountered scale-forming compounds. It is generally acknowledged that barium sulfate scale is almost impossible to remove by chemical means. Consequently, barium sulfate must be removed mechanically or the equipment, pipes, etc., containing the deposit must be discarded.

The incidence of barium sulfate scale is worldwide, and it occurs principally in systems handling subsurface waters. The barium sulfate scale problem is of particular concern to the petroleum industry since increasing volumes of water are produced with petroleum and more petroleum is produced by the waterflooding method of secondary recovery. The scale may occur in many different places, including production tubing, well bore perforations, the area near the well bore, gathering lines, meters, valves and in other production equipment.

Deposition of scale in production facilities and formation channels is a well-known source of problems in oil recovery. Barium sulfate scale is particularly troublesome when sulphate-rich seawater is used as an injection fluid in oil wells whose formation water is rich in barium ions. This scale causes severe problems in U.S. oil fields and older North Sea oil fields. Scaling of this nature is expected to occur during advanced production stages in other North Sea fields particularly after seawater breakthrough has taken place.

Barium sulfate scale may also form within subterranean formations such as in disposal wells. Scales and deposits can be formed to such an extent that the permeability of the formation is impaired resulting in lower flow rates, higher pump pressures, and ultimately abandonment of the well. U.,S. Pat. No. 4,708,805, issued to D'Muhala on Nov. 24, 1987, discloses a process and compositions for the sequestration of barium sulfate scale. The compositions comprised an aqueous solution of citric acid, a polycarboxylic acid, and an alkylene-polyaminopolycarboxylic acid. The preferred aqueous sequestering solution had a pH in the range of about 9.S to about 14. The pH was provided by a base selected from the group consisting of potassium hydroxide, potassium carbonate, and mixtures thereof. This patent is hereby incorporated by reference herein.

De Jong et al. in U.S. Pat. No. 4,190,462 disclose that barium sulfate scale can be removed from remote locations extending into a subterranean earth formation by contacting the scale with an aqueous solution consisting essentially of water, a monovalent cation salt of a monocyclic macroyclic polyamine containing at least two nitrogen-linked carboxymethyl groups and enough monovalent basic compound to provide a solution pH of about 8.

Although the prior art compositions remove scale, the rate of dissolution is slow and the amount of scale dissolved is small. Therefore, %what is needed is a method and composition for removing barium scale at a substantially increased rate and a high capacity.

SUMMARY OF THE INVENTION

This invention is directed to a composition for dissolving an alkaline earth sulfate scale. In its broadest aspect, the composition comprises an aqueous solution containing chelating agents selected from a member of the group consisting of aminocarboxylic acids, polyaminopolycarboxylic acids, or polyamines and mixtures thereof; and a catalyst selected from a member of the group consisting of anions of organic and inorganic acids having an ionization constant greater than about a $PK_a$ of 1. In one embodiment, the aqueous solution has a pH of about 8.0 to about 14.0. Into this solution is placed 0.1M to about 1.0M of an ethylenediaminetetraacetic acid (EDTA) or salt or diethylenetriaminepentaacetic acid (DTPA) or salt chelant. A catalyst is added to the aqueous solution. This catalyst is selected from the group consisting of anions of weak acids, both organic and inorganic having ionization constants less than $10^{-2}$ ($K_a < 10^{-2}$). Examples of these anions comprise oxalate, salicylate tartrate, fluoride, persulfate, and hypochlorite. The concentration of catalyst is about 0.01M to about 0.5M. Substantially improved scale dissolution rates are obtained when the aqueous solution containing the composition is heated to a temperature of about 25° C. to about 100° C. Higher temperatures are obtainable because at greater formation depths higher existing pressures will raise the boiling point of the aqueous solution.

The composition is particularly useful for more efficiently removing barium or strontium sulfate scale from wells, wellstream processing equipment, pipelines and tubular goods used to produce oil from a subterranean formation.

It is therefore an object of this invention to provide for a novel composition for dissolving alkaline earth metal sulfate scale at substantially quicker rates than heretofore possible.

It is another object of this invention to provide chemical compositions which are effective in solubilizing barium and strontium sulfate scales, deposits, or crystals.

It is still another object of this invention to provide a method of solubilizing barium or strontium sulfate thus enabling the removal of adherent barium and strontium sulfate scales, deposits and crystals from surfaces.

It is yet another object of this invention to provide a composition which will produce substantially higher levels of dissolved barium, strontium, calcium, and other alkaline earth sulfate scale than heretofore possible.

It is still a yet further object of this invention to provide for an alkaline earth sulfate scale dissolution composition at a substantially reduced cost.

DESCRIPTION OF THE PREFERRED EMBODIMENTS

This invention is directed to a composition and method for dissolving an alkaline earth metal sulfate scale. More particularly, it is directed to a composition and method for dissolving barium sulfate scale contained in equipment used to produce oil and/or water to the surface. The composition comprises an aqueous solution having a pH of from about 8.0 to about 14.0. Into this solution is placed about 0.1 to about 1.0M of ethylenediaminetetraacetic acid (EDTA) or diethylenetriaminepentaacetic acid (DTPA), or salts thereof, which serves as a chelant. Thereafter, a catalyst is added to the aqueous solution in about 0.01 to about 0.5M. The catalyst is selected from a member of the group coasting of fluoride, oxalate, persulfate, dithionate, hypochlorite, formate, thio, amino, salicylate, and hydroxy acetate anions. This catalyst will have an ionization constant of less than about $10^2$ ($K_a < 10^{-2}$). This aqueous composition can be used to remove scale from equipment utilized in the production of oil and/or water from an underground formation. Said composition can be utilized to resolve scaling conditions and problems mentioned above.

The aqueous solution containing the composition can be directed down a wellbore to remove barium sulfate scale which has fouled the tubular equipment and passage ways. Prior to being directed into the wellbore, the composition may be heated to a temperature between about 25° C. to about 100° C. Once within the tubular goods and the passage ways requiring treatment, the composition is allowed to remain there for about ten minutes to about 7 hours. After remaining in contact with the equipment for the desired time, the composition containing the dissolved scale is produced to the surface. This procedure can be repeated as often as required to remove scale from the equipment.

The cleaning solution may be circulated over or along the surfaces to be cleaned. In this procedure, the composition may be circulated through the tubular goods in the well. This may be accomplished by pumping it down through the production tube and returning it to the surface through the annular space between the production tubes and the casing (or vice versa). Also, the cleaning solution may be pumped down through the production tubing and into the formation, thereby cleaning the well and the formation pore space by dissolving barium sulfate present therein while flowing over and along the surfaces that need cleaning. The spent composition of such once-through dynamic waste procedure can be subsequently returned to the surface, for example, by displacement or entrainment with the fluids that are produced through the well after the cleaning operation. In an alternative manner, the cleaning solution nay be applied batchwise fashion, for example, by flowing the solution into the well and optionally into the pore spaces of the adjacent earth formation and there keeping the solution in contact in non-flowing condition with the surfaces that are covered with barium sulfate scale, during a period of time sufficient to dissolve at least a considerable part of said scale.

In order to test the barium sulfate scale-dissolving capacities of the composition, several aqueous compositions have been demonstrated in laboratory tests described in the discussions which follow. The experiments described below were carried out in a cylindrical glass vessel having a height of 10 cm and an internal diameter of 7.5 cm.

Figure 1:
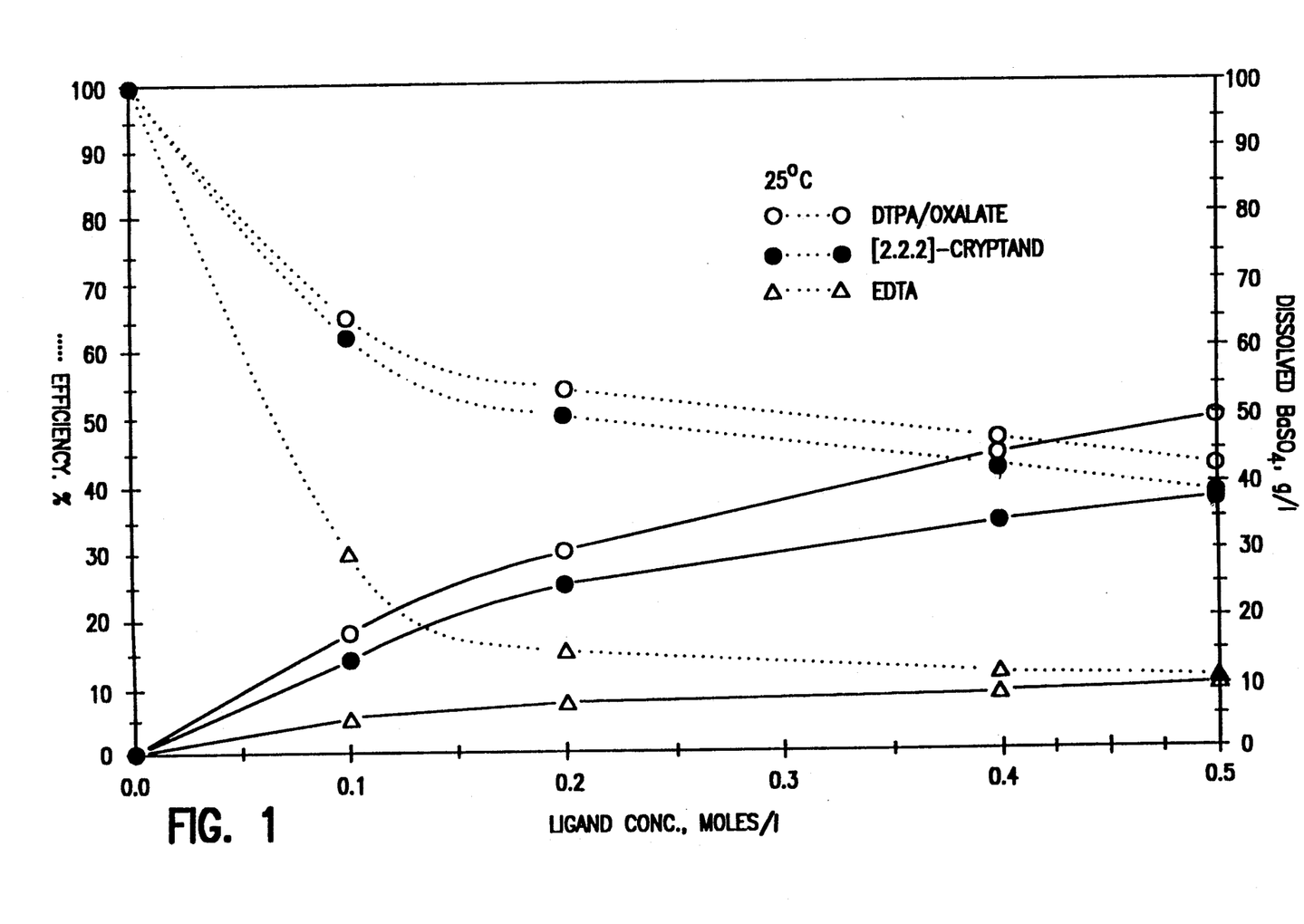
FIG. 1 is a graph which depicts the dissolution efficiency of barium sulfate as a function of ligand concentration.

As shown in FIG. 1, varying concentrations of DTPA and EDTA are compared with 2.2.2-cryptand which is described in U.S. Pat. No. 4,215,000 and is hereby incorporated by reference herein. As described, various concentrations of DTPA with oxalate and EDTA were compared with the barium sulfate dissolution of 2.2.2-cryptand. The results were obtained at 25° C. and demonstrate that DTPA/oxalate complexes more barium sulfate (49 g/l) than 2.2.2-cryptand (37 g/l). As the dotted lines in the graph reveal, DTPA/oxalate is substantially more efficient than either 2.2.2-cryptand or an EDTA chelant at all concentrations. Efficiency of a chelant or solvent is defined as the fraction of chelant that is complexed with barium divided by the total concentration of chelating agent.

Figure 3:
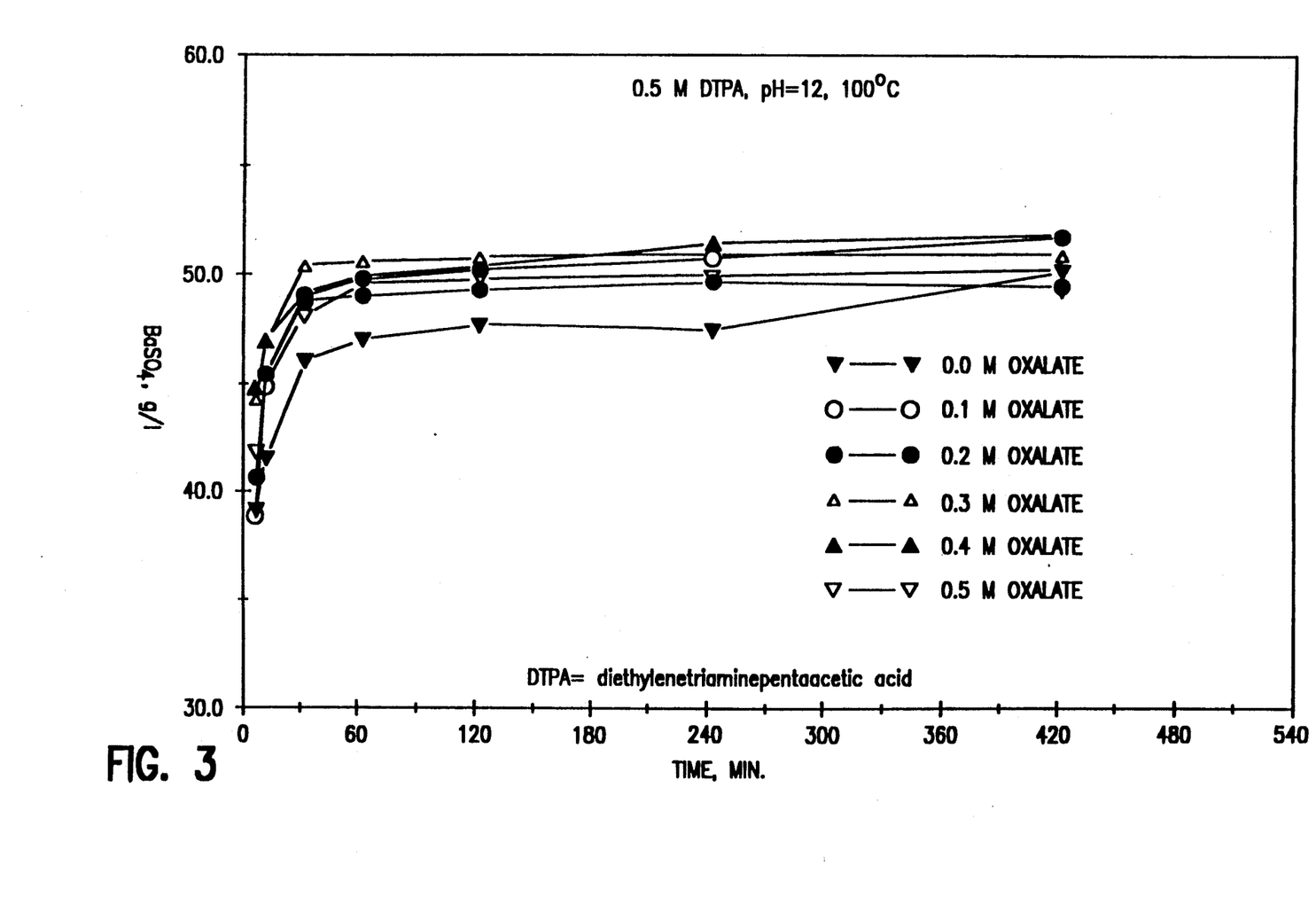
FIG. 3 is a graphical representation of the rate of barium sulfate dissolution in the presence of a solution having a pH of 12, 0.5M DTPA, and varying concentrations of an oxalate catalyst at a temperature of 100° C.

The amount of oxalate catalyst utilized in combination with DTPA is not critical. This is illustrated in FIG. 3 which further indicates that all concentrations of oxalate catalyst from 0.1 to 0.5M contribute to the dissolution of 80 to 90 percent of the saturation level of barium sulfate within ten (10) minutes of contact. Additionally, as demonstrated in FIG. 3, the fast rate of reaction (dissolution) is a novel feature of this invention. Another novel feature of this invention is the high saturation levels of dissolved barium, strontium and calcium sulfate scales which are obtained in the aqueous solution.

Figure 4:
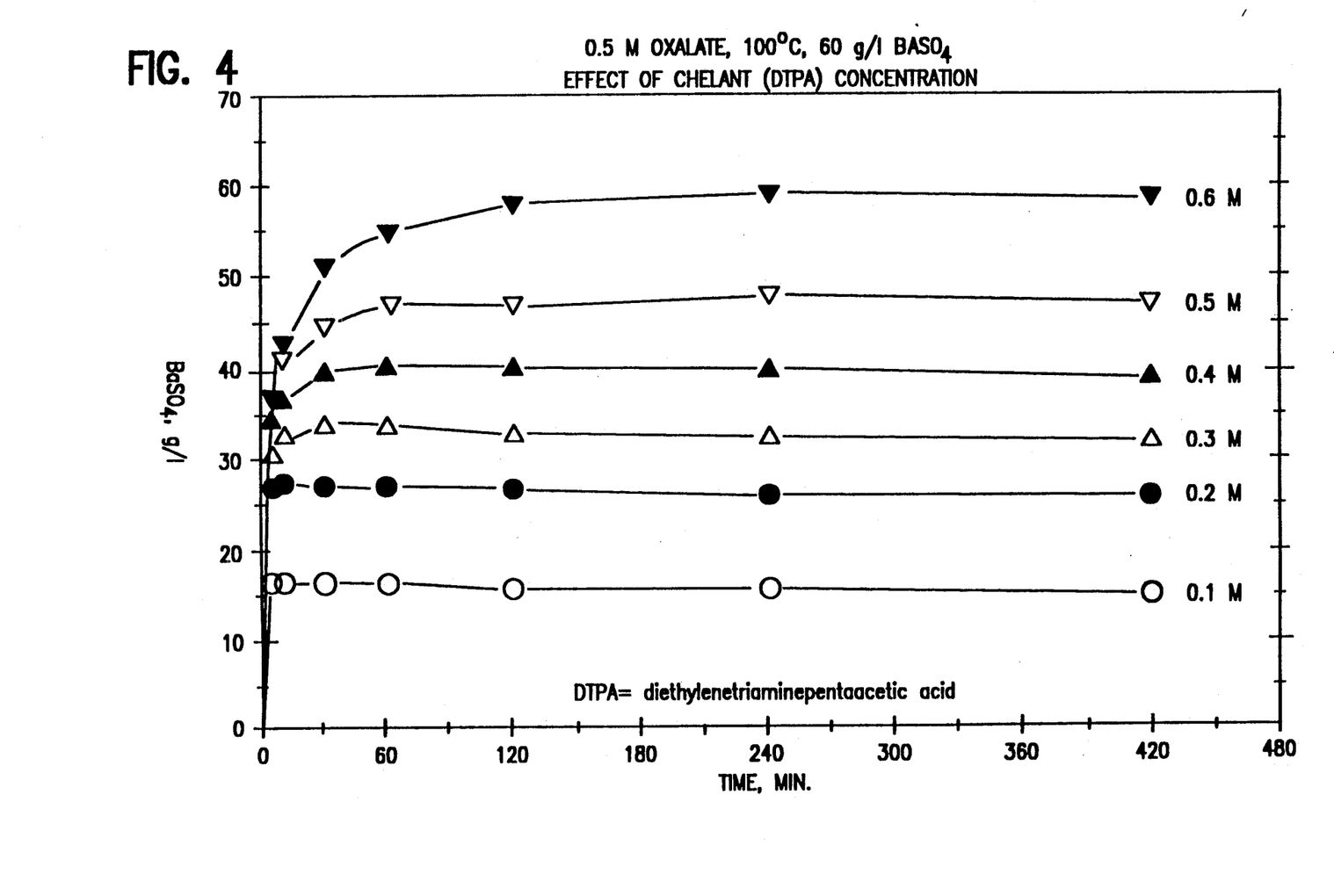
FIG. 4 shows the rate of barium sulfate dissolution in a solution having a pH of 12 and an oxalate catalyst where varying concentrations of DTPA are utilized.

Barium sulfate or other scales dissolved in the solvent are influenced by the concentration of chelant used. The effect of varying the DTPA concentration is depicted in FIG. 4. Increased DTPA concentration causes an increase in the rate of barium sulfate dissolution and the amount of barium sulfate held in the solvent.

Figure 5:
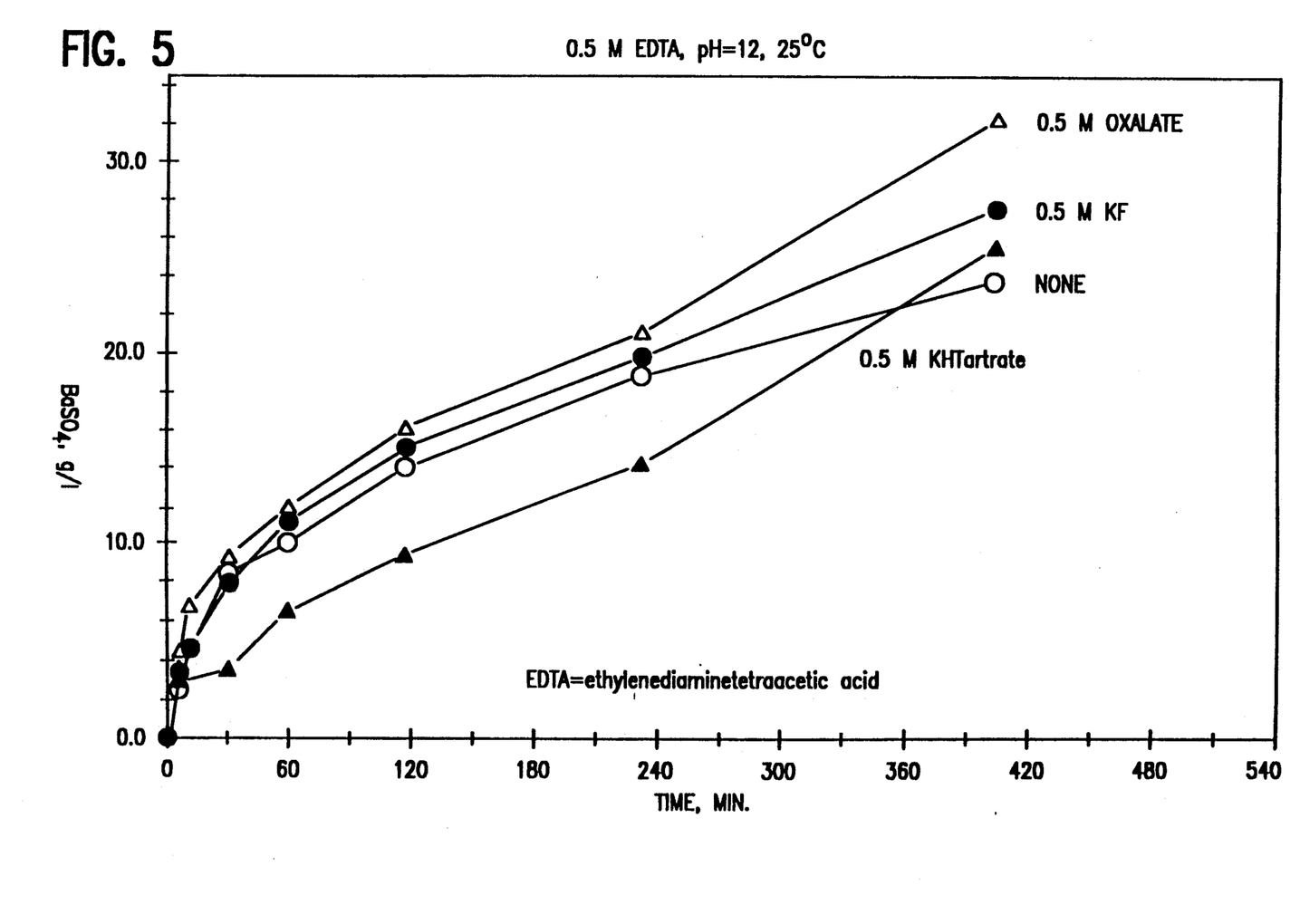
FIG. 5 is a graphical representation of the rate of barium sulfate dissolution in 0.5M EDTA with catalysts of 0.5M oxalate, 0.5M potassium fluoride and 0.5M potassium acid tartrate.
Figure 6:
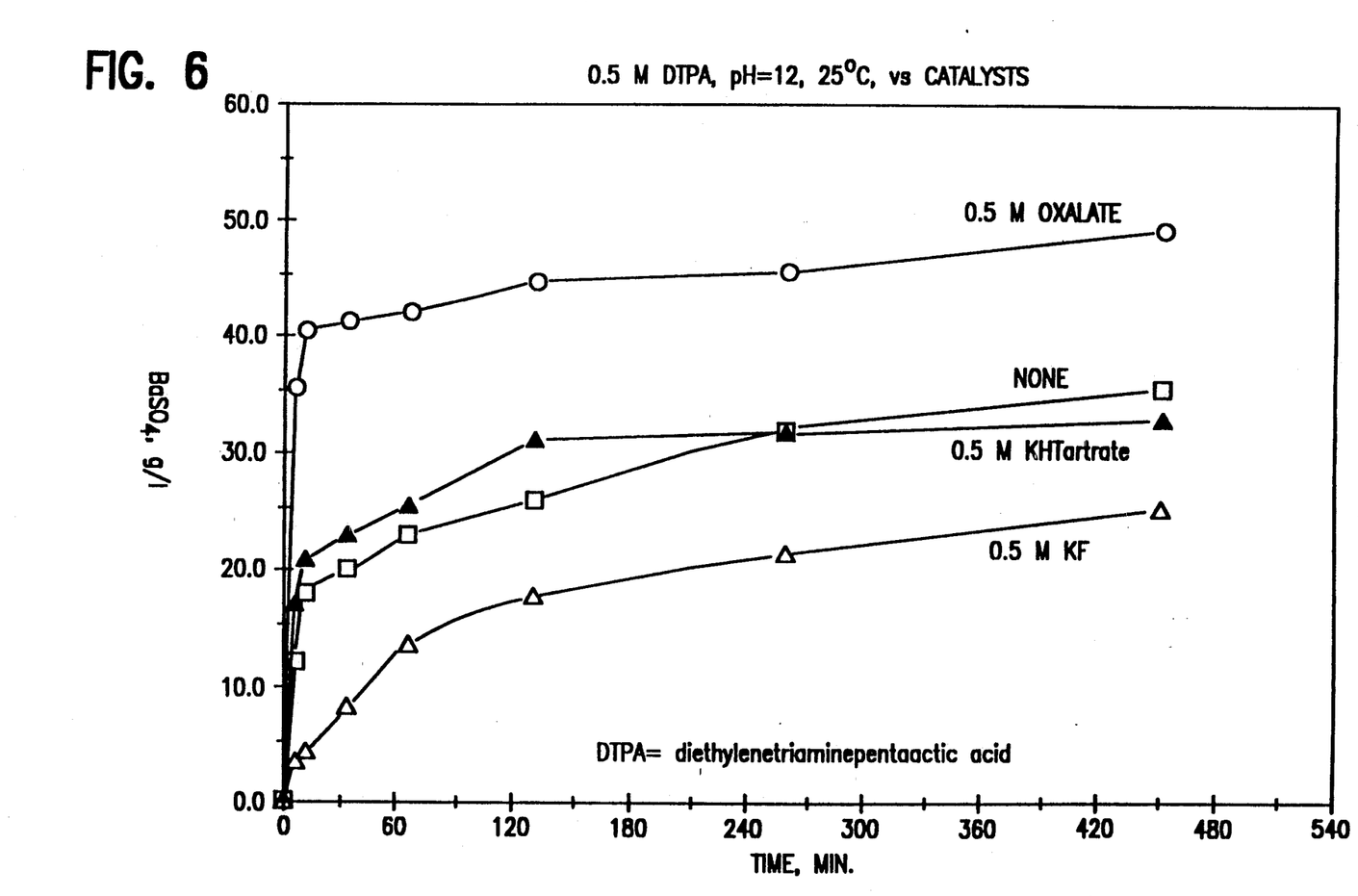
FIG. 6 is a graph depicting the rate of barium sulfate dissolution in 0.5M DTPA with catalysts of 0.5M potassium fluoride, 0.5M oxalate, and 0.5M potassium acid tartrate at 915° C.

FIG. 5 illustrates the rate of barium sulfate dissolution when 0.5M EDTA is used with 0.5M catalysts including oxalate, potassium fluoride and potassium hydrogen tartrate. FIG. 5 also illustrates the barium sulfate dissolution rate when 0.5M EDTA is used alone. The temperature of the solvent in which the catalyst is used affects the rate of barium sulfate or scale dissolution. This is further shown in FIG. 6. Here differences in the barium sulfate or scale dissolution rate of a solvent containing 0.5M DTPA is shown when the temperature is maintained at 100° C. and 25° C. with designated catalysts. These catalysts comprise 0.5M potassium fluoride, 0.5M oxalate and 0.5M potassium acid tartrate.

Figure 7:
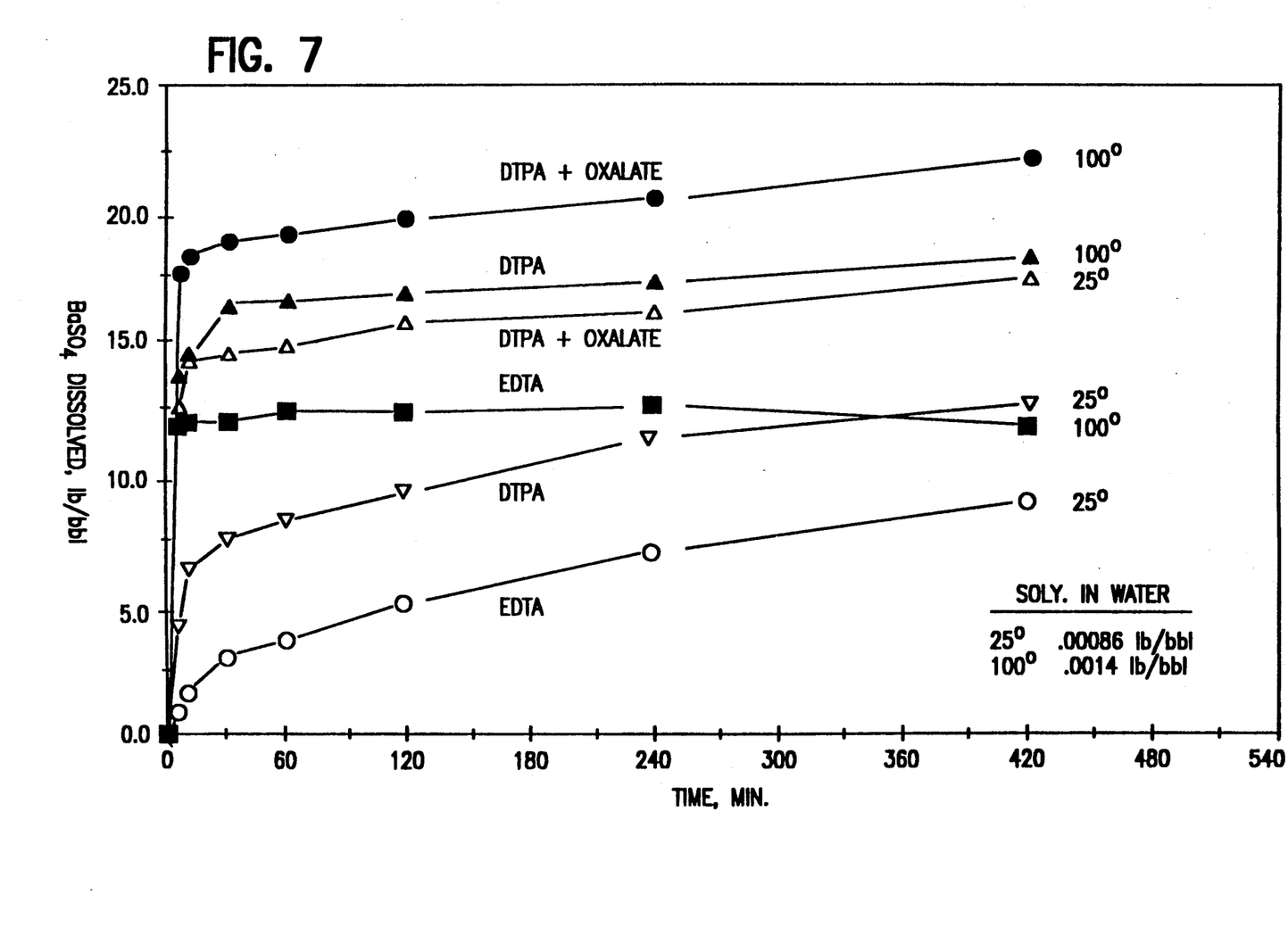
FIG. 7 is a graphical representation of differences in the rate of barium sulfate dissolution by DTPA with and without an oxalate catalyst.

Effectiveness of an oxalate catalyst is shown with DTPA when compared to DTPA alone at 25° C. and 100° C. This is illustrated in FIG. 7. DTPA with oxalate at 25° C. has nearly the same barium sulfate dissolution rate as DTPA only at a temperature of 100° C. Examining FIG. 7, it is readily apparent that the oxalate catalyst caused the difference. This is apparent since the barium sulfate dissolution rate of DTPA with oxalate at 25° C. is much greater than the dissolution rate of barium sulfate by DTPA alone at 25° C. As illustrated in FIG. 7, about 90 percent of the scale is dissolved in the lab within the first ten minutes of contact using powdered $BaSO_4$. Much slower rates of barium sulfate dissolution are shown when EDTA and DTPA are utilized without a catalyst at 25° C.

Figure 8:
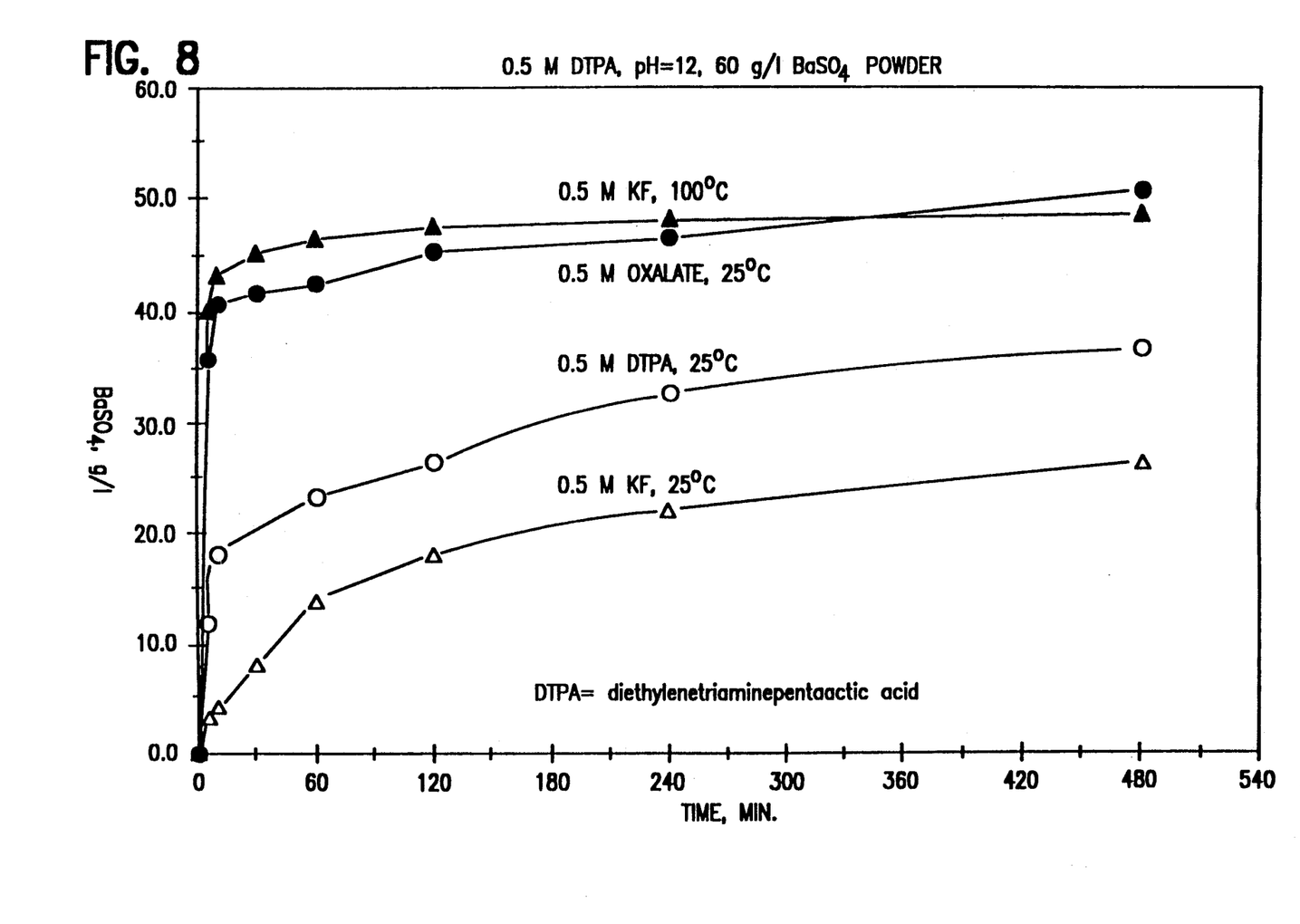
FIG. 8 is a graph which depicts the rate of barium sulfate dissolution in 0.5M DTPA with catalysts of 0.5M potassium fluoride and 0.5M oxalate at various temperatures.

Although catalysts greatly enhance the rate of barium sulfate dissolution by DTPA or EDTA, this enhancement varies with the particular catalyst employed. FIG. 8 illustrates graphically the difference in barium sulfate dissolution when selected catalysts are utilized with DTPA. These catalysts comprise 0.5M potassium fluoride at 100° C. and 25° C., and 0.5M oxalate at 25° C.

Figure 2:
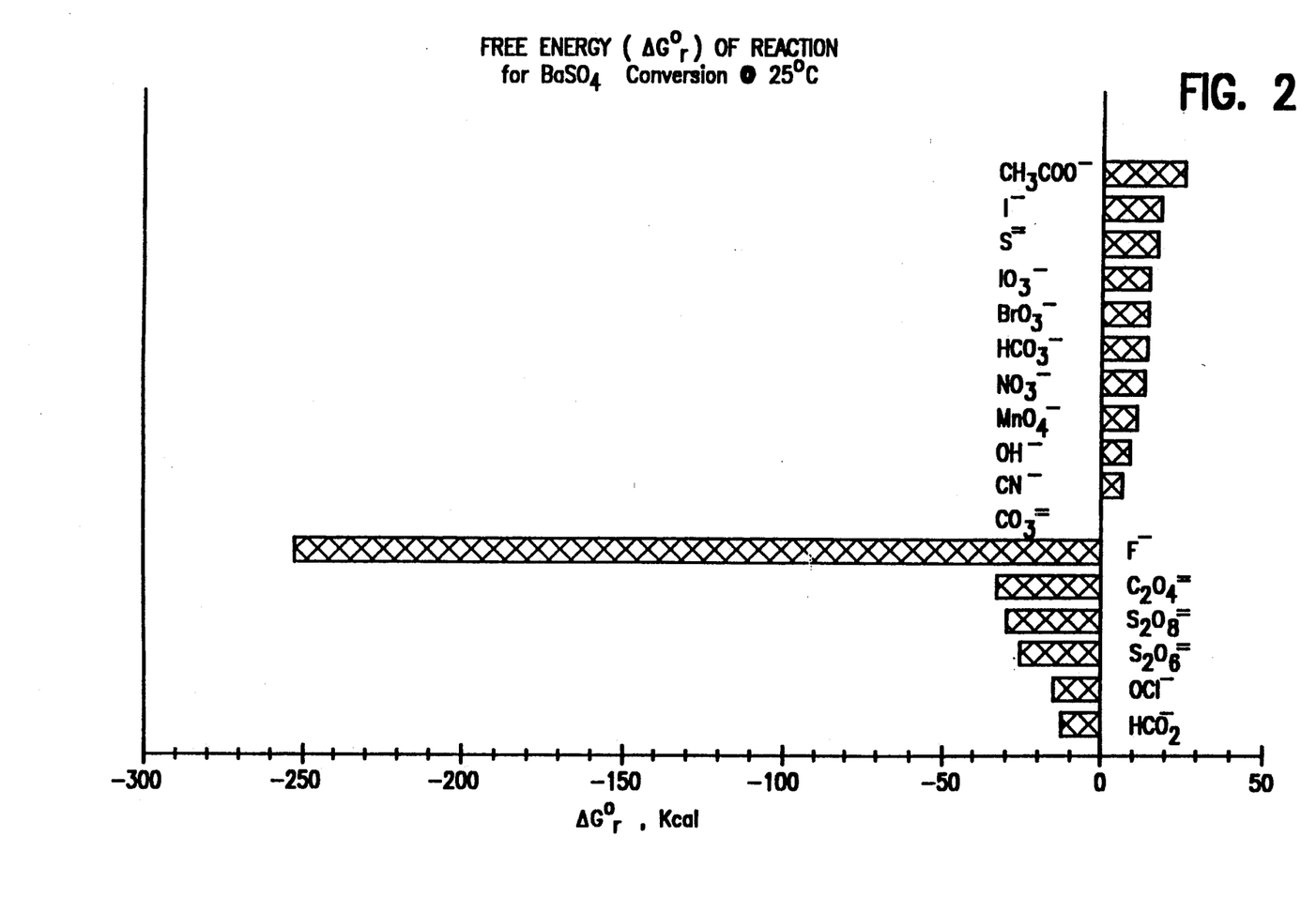
FIG. 2 is a graph which depicts the free energy of reaction for barium sulfate conversion at 25° C.

As mentioned above, the rate of barium sulfate scale dissolution varies with the solvent composition utilized. In order to determine candidates for use as a solvent, free energy calculations for the conversion of barium sulfate to barium carbonate were utilized. This is a well known conversion using concentrated sodium carbonate elution and solid alkaline earth metal sulfates. Free energy of conversion of barium sulfate to barium carbonate is calculated as essentially zero, meaning that the conversion is energetically favorable. However, the conversion is expected to reach equilibrium with less than full conversion of barium sulfate to barium carbonate. This is the actual reaction situation with only about 75-80 percent of the barium sulfate being converted. Further calculations were made using common anions, both organic and inorganic. Some of the anions considered are shown in FIG. 2 of the free energy graph. Those anions &with a negative free energy of reaction are considered very reactive toward conversion of alkaline earth sulfates to the respective barium compounds. Many of the anions aye by nature strong oxidizing agents, for example, persulfate ($SO_2O_8$), dithionate ($S_2O_6$), and hypochlorite (OCl), normally would not be considered practical for use in a hydrocarbon environment. Fluoride ($F^-$) and oxalate ($C_2O_4^=$) anions are found to be very active catalysts for ethylenediaminetetraacetic acid (EDTA) and diethylenetriaminepentaacetic acid (DTPA) or their salts for dissolution of barium sulfate, respectively. Experimentally, it was determined that the catalysts alone (without EDTA OR DTPA) have no scale dissolution properties of their own. While not desiring to be bound to a particular theory concerning the actual mechanism of this activity in converting or dissolving, it is believed that adsorption of either catalyst on the barium sulfate surface modifies the surface crystal structure in such a way that the barium in the modified crystal is easily removed by the chelating agent.

Oxalic acid or salts are used to obtain oxalate anions. Salicylic acid, the precursor to aspirin, is also an effective catalyst for dissolution of barium, strontium and calcium sulfates in combination with DTPA. Experiments indicate that it has a higher rate of dissolution and saturation level than oxalate anions. Both oxalic and salicylic acids are commercially available and are relatively inexpensive. For 0.1 to 0.5 molar concentrations, salicylic acid would add $5 to $24 per barrel for chemical cost, whereas oxalic acid would contribute from about $2 to $7 to the cost per barrel.

Salicylic acid is used to obtain salicylate anions. Effective catalyst anions are also obtainable from aminoacetic acid (glycine), glycolic acid (hydroxyacetic acid), and thioglycolic acid (mercaptoacetic acid).

Distilled water was used in the majority of tests for determination of the rate of barium sulfate dissolution and saturation. Some tests were run with Dallas city tap water and synthetic seawater. A minor decrease in efficiency was observed with tap water. About a 20 percent decrease in efficiency was observed when seawater was used. This was expected, since seawater has interfering ions, e.g. calcium and magnesium. These interfering ions complex with the chelating agent, either DTPA or EDTA, and reduce the overall dissolving power. Additionally, it has been determined that halogen ions have a negative effect on dissolving power as a function of the size of the halogen ion. Dissolution rate is increased as the halogen ion size is reduced and the charge density is increased, i.e. in the order of iodide, bromide, chloride and fluoride. Fluoride ion definitely enhances EDTA solvents, but not DTPA: fluoride inhibits most DTPA/catalyst solvents.

The effect of cations is also very important to the success of the scale solvent, especially when added with the sizable portion of caustic required to adjust the pH to 12. Dissolution is enhanced as the size of the cation is increased, i.e. lithium, sodium, potassium and cesium. Lithium and sodium hydroxides in the presence of EDTA, or DTPA, and catalysts are not soluble at a pH of 12, the optimum value. Cesium is too difficult to obtain, both in quantity and price. Therefore, potassium hydroxide, in the form of caustic potash, is the pH adjusting reagent of choice.

One example of a preferred aqueous solvent which can be used comprises 0.5M DTPA and 0.3M oxalic acid adjusted to a pH of 12 with potassium hydroxide.

Another example of a preferred aqueous solvent for use herein comprises 0.5M EDTA and 0.5M KF adjusted to a pH of 12 with potassium hydroxide.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A composition for dissolving an alkaline earth metal sulfate scale comprising:
   a) an aqueous solution having a pH of from about 8 to about 14 which pH is obtained by adjustment with potassium hydroxide;
   b) 0.1 to about 1.0M of a diethylenetriaminepentacetic acid (DTPA) chelating agent, or salts thereof; and
   c) a catalyst comprising formate anions having an ionization constant of less than about $10^2$ ($K_a < 10^{-2}$) thereby making a composition which can dissolve substantially more of said scale within a substantially reduced time period than is possible with said chelating agent alone.

2. The composition of claim 1 which is heated to a temperature of from about 25° C. to about 100° C. or higher depending upon the depth to which said composition is injected into a subterranean formation.

3. The composition of claim 1 where substantially high saturation levels of dissolved barium, strontium or calcium sulfate are produced from the scale.

4. The composition of claim 1 where about 80% to about 90% of a saturation level of barium, strontium or calcium sulfate is dissolved from scale in about 10 minutes at a temperature of about 100° C.

5. The composition of claim 1 where the scale comprises barium sulfate.

6. A composition for dissolving an alkaline earth metal sulfate scale comprising:
   a) an aqueous solution having a pH of from about 8 to about 14 which pH is obtained by adjustment with potassium hydroxide;
   b) 0.1 to about 1.0M of a diethylenetriaminepentacetic acid (DTPA) chelating agent, or salts thereof; and
   c) a catalyst comprising formate anions having an ionization constant of less than about $10^2$ ($K_a < 10^{-2}$) in an amount sufficient to dissolve about 80% to 90% of said scale in about 10 minutes at a temperature of up to about 100° C. or higher.

7. The composition as recited in claim 6 which is heated to a temperature of from about 25° C. to about 100° C. or higher depending upon the depth to which said composition is injected into a subterranean formation.

8. The composition as recited in claim 6 where substantially high saturation levels of dissolved barium, strontium or calcium sulfate are produced from the scale.

9. The composition as recited in claim 6 where said scale comprises barium sulfate.

10. An aqueous composition for dissolving barium or strontium sulfate scale comprising:
    a) an aqueous solution adjusted to a pH of about 12 with potassium hydroxide;
    b) 0.1 to about 1.0M of a DTPA chelating agent; and
    c) a catalyst comprising formate anions having an ionization constant of less than about $10^2$ ($K_a < 10^{-2}$) in an amount sufficient to dissolve about 80% to 90% of said scale in about 10 minutes at a temperature of up to about 100° C. or higher.

11. The composition as recited in claim 10 which is heated to a temperature of from about 25° C. to about 100° C. or higher depending upon the depth to which said composition is injected into a subterranean formation.

12. The composition as recited in claim 10 where substantially high saturation levels of dissolved barium and strontium sulfate are produced from the scale.

* * * * *